United States Patent [19]

Stadtfeld

[11] Patent Number: 4,930,950
[45] Date of Patent: Jun. 5, 1990

[54] APPARATUS FOR ADJUSTING THE DRUMS OF A BEVEL-GEAR CUTTING MACHINE

[75] Inventor: Hermann Stadtfeld, Dielsdorf, Switzerland

[73] Assignee: Werkzeugmaschinenfabrik Oerlikon-Bührle, Zürich, Switzerland

[21] Appl. No.: 386,458

[22] Filed: Jul. 28, 1989

[30] Foreign Application Priority Data

Aug. 16, 1988 [CH] Switzerland .................. 03076/88

[51] Int. Cl.$^5$ .............................................. B23F 9/00
[52] U.S. Cl. .......................................... 409/27; 409/2
[58] Field of Search .................. 409/27, 28, 29, 30, 409/2

[56] References Cited

U.S. PATENT DOCUMENTS

| | | | |
|---|---|---|---|
| 2,667,818 | 2/1954 | Stewart et al. | 409/29 X |
| 3,009,397 | 11/1961 | Picanol | 409/30 |
| 3,212,403 | 10/1965 | Deakin | 409/27 |
| 3,213,756 | 10/1965 | Ash, II | 409/30 X |

FOREIGN PATENT DOCUMENTS

| | | |
|---|---|---|
| 1939848 | 4/1970 | Fed. Rep. of Germany . |
| 3643967 | 7/1987 | Fed. Rep. of Germany . |
| 2273619 | 1/1976 | France . |
| 257782 | 6/1988 | German Democratic Rep. . |

OTHER PUBLICATIONS

B. A. Shtipelman: "Design & Manufacture of Hypoid Gears", 1978, J. Wiley & Sons (New York, U.S.), see pp. x and 125: p. x (preface) lines 5–7 and p. 125 line 13.

*Primary Examiner*—Z. R. Bilinsky
*Attorney, Agent, or Firm*—Werner W. Kleeman

[57] ABSTRACT

In addition to a generating drum, by means of which gear wheels to be maufactured according to the generating method are produced, the gear-cutting machine also comprises setting drums, particularly an eccentric drum, an orientation drum and an inclination drum. Prior to commencing the gear-cutting operation to produce a gear wheel by means of a cutter head, these three setting drums are rotated into the respective required position by means of the adjusting apparatus constructed according to the invention. This adjusting apparatus comprises a computer for controlling the setting of the drums and a locking device controllable by the computer for locking or securing one setting drum at the cutter head. Furthermore, there is provided an automatic position-reading device for transmitting the setting of the drums to the computer, as well as a device controllable by the computer for actuating clamping devices of the respective setting drums.

4 Claims, 5 Drawing Sheets

APPARATUS FOR ADJUSTING THE DRUMS OF A BEVEL-GEAR CUTTING MACHINE1

CROSS-REFERENCE TO RELATED APPLICATIONS

This application is related to the commonly assigned, copending U.S. applications, Ser. No. 374,656, filed Jun. 30, 1989, entitled "POSITION-READING SYSTEM FOR MACHINE-TOOL PARTS ROTATABLE THROUGH 360°" and Ser. No. 381,111, filed Jul. 17, 1989, entitled "APPARATUS FOR AND METHOD OF PRODUCING A GEAR WHEEL".

BACKGROUND OF THE INVENTION

The present invention broadly relates to a gear-cutting process and pertains, more specifically, to a new and improved apparatus for adjusting the drums of a bevel-gear cutting machine.

Generally speaking, the new and improved construction of apparatus for adjusting the drums of a bevel-gear cutting machine is of the type comprising:

a generating stock having a motor-driven generating drum and a plurality of setting drums, particularly an eccentric drum, an orientation drum and an inclination drum;

clamping devices for clamping one of the setting drums in its desired position at the adjacent setting drum therefor;

reading devices for reading the set or adjusted position of each setting drum;

a cutter head which is rotatably mounted in the setting drums; and a gear train for driving the cutter head.

A bevel-gear cutting machine contains a rotatably mounted motor-driven generating drum in a generating stock or column in order to produce gear wheels according to the generating method. In this generating drum there is rotatably mounted an eccentric drum. An orientation drum is rotatably mounted in the eccentric drum and, finally, an inclination drum is rotatably mounted in the orientation drum.

A cutter head is rotatably mounted in the inclination drum. The setting drums, i.e. the eccentric drum, the orientation drum and the inclination drum have to be adjusted or set prior to manufacture of a gear wheel such that the cutter head rotatably mounted in these setting drums assumes the desired position for cutting a gear wheel.

In known gear-cutting machines this adjustment of the setting drums is very complicated and only possible with various auxiliary or supplementary means. Since these setting drums, namely the eccentric drum, the orientation drum and the inclination drum are unsymmetrically constructed and since the two setting drums in the front are also eccentrically structured, the mass center of each setting drum is outside or beyond the respective drum axis of rotation and the force of gravity causes a torque to act upon these setting drums.

To avoid having to provide a separate drive for each setting drum, it would be conceivable to rotate the setting drums into the desired position by means of a motor-driven cutter head and by means of a coupling or connection of the setting drum with the cutter head, such setting drum being the drum to be adjusted. For example, it should be possible to connect the cutter head with the inclination drum, release the clamping between the inclination drum and the orientation drum and then very slowly drive the cutter head until the inclination drum reaches the desired position. In order that this process can be automated, the clamping or releasing of each setting drum would have to be automatically effected, for example, by means of a set of springs or a hydraulic drive, and the connection between the cutter head and the inclination drum would have to be accomplished by an electromagnetically actuatable locking device.

Unfortunately, the adjustment of the setting drums in this manner is not feasible because the aforesaid torques are far too large, although these torques which are subject to the action of gravity actually augment or promote rotational motion in certain positions of the setting drums. However, in other positions of the setting drums these torques obstruct rotation. Such torques are of such a magnitude that the gear train for the drive of the cutter head would be seriously damaged.

SUMMARY OF THE INVENTION

Therefore, with the foregoing in mind, it is a primary object of the present invention to provide a new and improved construction of an apparatus for adjusting the drums of a bevel-gear cutting machine, and which apparatus does not suffer from the aforementioned drawbacks and shortcomings of the prior art constructions.

Another and more specific object of the present invention aims at providing a new and improved apparatus for adjusting the drums of a bevel-gear cutting machine and by means of which the setting drums can be rotated into a desired position despite the presence of the aforesaid torques and without the provision of additional drives.

Yet a further significant object of the present invention aims at providing a new and improved construction of an apparatus for adjusting the drums of a bevel-gear cutting machine, which apparatus is relatively simple in construction and design, highly reliable in operation, not readily subject to malfunction and requires only a minimum of maintenance and servicing.

Now in order to implement these and still further objects of the invention, which will become more readily apparent as the description proceeds, the apparatus for adjusting the drums of a bevel-gear cutting machine of the present invention is manifested, among other things, by the features that a computer or computer means is provided for controlling the adjustment of the setting drums, that locking means controllable by the computer or computer means serve to lock or secure one setting drum at the cutter head and that the reading devices for reading the set or adjusted position of the generating drum and each setting drum comprise automatic position-reading means for transmitting the position of the drums to the computer or computer means. Furthermore, means are provided for actuating the clamping devices for clamping one of the setting drums in its desired position at the setting drum adjacent thereto, such actuating means being controllable by the computer or computer means.

The setting drums particularly comprise an eccentric drum, an orientation drum and an inclination drum.

The motor-driven generating drum is advantageously utilized for the adjustment of a given one of the setting drums, and the cutter head locked or held by means of the gear train is advantageously utilized for retaining the other setting drums, whereby these other setting drums of the plurality of setting drums include the one given setting drum to be adjusted by the motor-driven generating drum and the setting drums located between the one setting drum to be adjusted and the one setting drum locked or secured at the cutter head by the locking means. Clamping devices serve for clamping one of the setting drums in the desired or predetermined setting position thereof at the setting drum adjacent thereto and other such clamping devices are advantageously utilized for clamping the aforesaid other setting drums at the cutter head and for clamping at the generating drum the setting drums located between the setting drum to be adjusted and the generating drum.

The apparatus of the present invention is advantageous in that all setting drums are automatically adjustable by an electronic control system. All that is required is to store the desired setting data, for example, in a diskette or other suitable data carrier and insert the diskette in the electronic control system. The adjustment of all the setting drums is then automatically carried out.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the structure of the exemplary embodiment of the apparatus for adjusting the drums of a bevel-gear cutting machine has been illustrated therein as is needed to enable one skilled in the art to readily understand the underlying principles and concepts of this invention.

Figure 1:
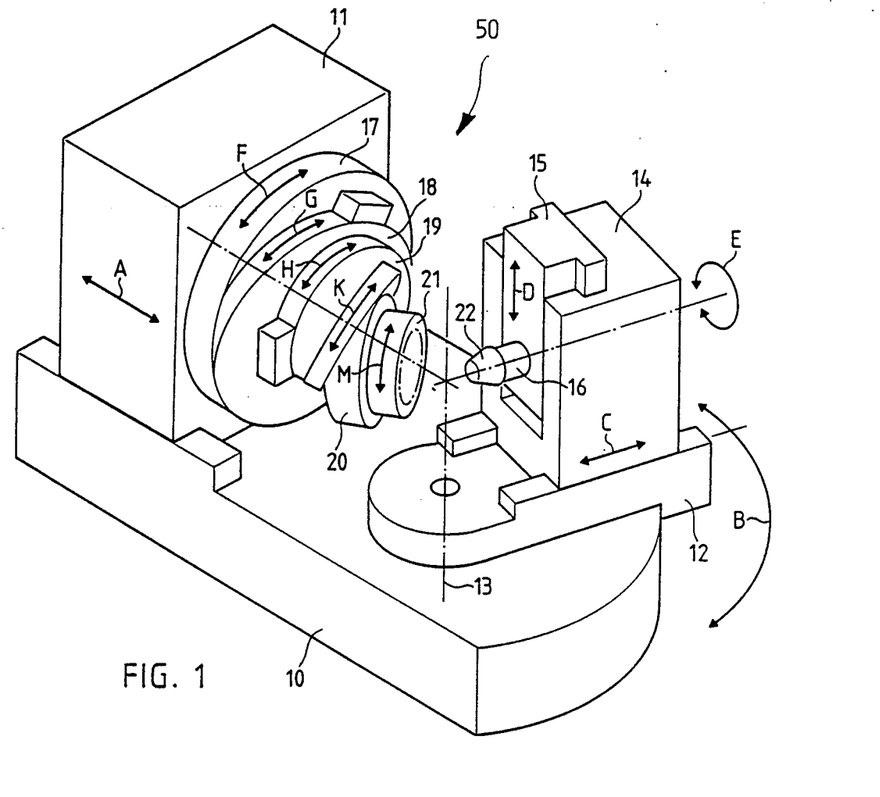
FIG. 1 is a perspective view of a bevel-gear cutting machine.

Turning attention now specifically to FIG. 1 of the drawings, a bevel-gear cutting machine 50 illustrated by way of example and not limitation will be seen to comprise a machine bed 10 upon which, on the one hand, a generating stock or column 11 is displaceably mounted in the direction of the double-headed arrow A and, on the other hand, a headstock guide or guidance 12 is pivotably mounted for rotation about a swivel or pivot axis 13 in the direction of the double-headed arrow B. At this headstock guide or guidance 12 there is provided a headstock 14 which is displaceably mounted in the direction of the double-headed arrow C. A carriage 15 is mounted at the headstock 14 to be substantially vertically displaceable in the direction of the double-headed arrow D. At this carriage 15 there is located a workpiece spindle 16 which is rotatable in the direction of the double-headed arrow E.

At the generating stock or column 11 there is provided a generating drum 17 for rotation in the direction of the double-headed arrow F. Upon this generating drum 17 there is rotatably mounted an eccentric drum 18 for rotation in the direction of the double-headed arrow G. In turn, an orientation drum 19 is rotatably mounted at the eccentric drum 18 for rotation in the direction of the double-headed arrow H. Finally, an inclination drum 20 is rotatably mounted at the orientation drum 19 for rotation in the direction of the double-headed arrow K.

A cutter head 21 for cutting a workpiece 22 is rotatably mounted at the inclination drum 20 for rotation in the direction of the double-headed arrow M. The workpiece 22 is fastened in known manner at the workpiece spindle 16 by means of an automatic chuck or work-locating fixture which is not particularly shown in the drawings.

Within the headstock 14 there is located a drive for the workpiece spindle 16 and within the generating stock or column 11 there is provided a drive for the cutter head 21. The cutter head 21 and the workpiece spindle 16 are preferably synchronously driven with respect to one another by means of a suitable gear drive not particularly shown in the drawings. However, the workpiece spindle 16 can also be driven by an electric motor which is connected by means of an electronic gearing with a second electric motor for driving the cutter head 21. The drive of the cutter head 21 and the workpiece spindle 16 is known to the art and conventional and is therefore not particularly shown in the drawings.

The generating drum 17 is likewise driven by a motor or any other suitable drive means since this generating drum 17 continuously changes its position during the gear-cutting operation, provided the gear-cutting machine operates on the generating principle. The other three drums, namely the eccentric drum ]8, the Orientation drum 19 and the inclination drum 20, are pivoted or rotated into the respective required positions and clamped there at the beginning of the gear-cutting operation for producing a workpiece or gear wheel 22. This is the reason why in known gear-cutting machines there is no motor drive available for these three setting drums 18, 19 and 20. For the adjustment of these three setting drums 18, 19 and 20 there have been used up to now readily removeable or disengageable auxiliary gear drives which rendered possible a more or less accurate setting of the eccentric drum 18, the orientation drum 19 and the inclination drum 20.

In accordance with the present invention, the adjustment of the three setting drums, namely the eccentric drum 18, the orientation drum 19 and the inclination drum 20 should be facilitated and substantially improved in order to ensure an adjustment which is as accurate as possible. The apparatus constructed according to the present invention for adjusting the eccentric drum 18, the orientation drum 19 and the inclination drum 20 will be discussed hereinafter in conjunction with FIG. 2 of the drawings.

Figure 2:
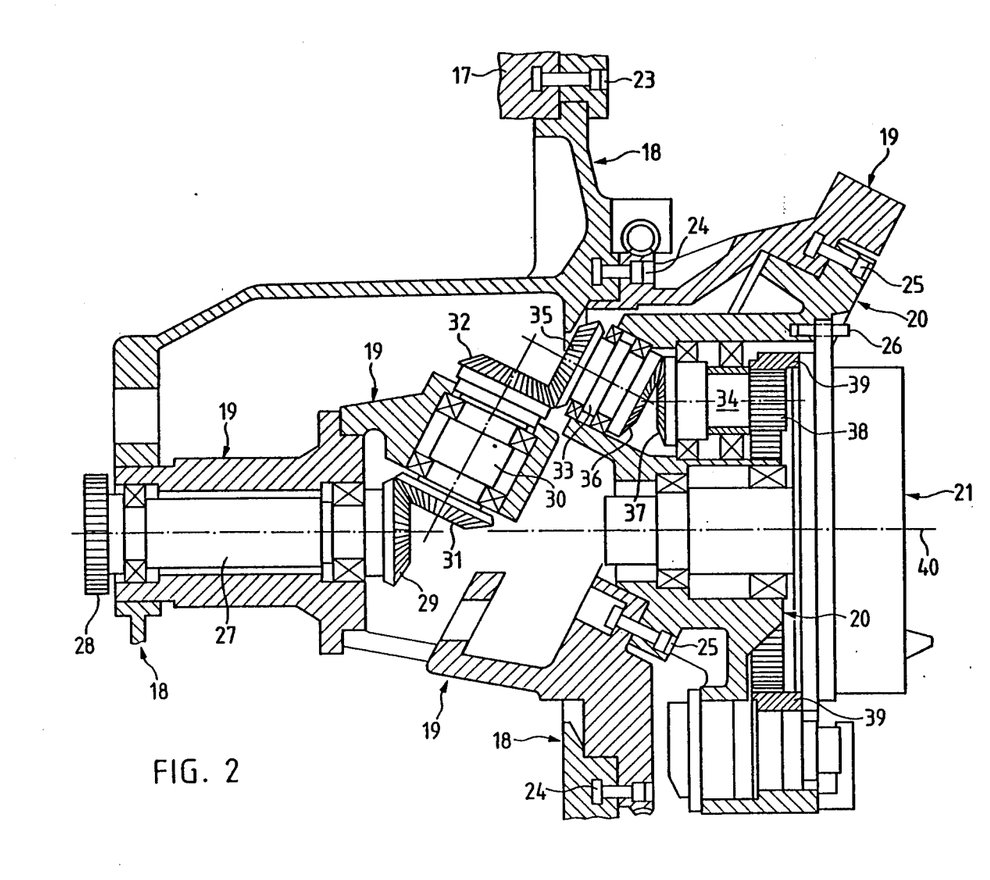
FIG. 2 is a sectional view taken through the drums of the bevel-gear cutting machine illustrated in FIG. 1.

According to such FIG. 2, the eccentric drum 18 is rotatably mounted in the generating drum 17 which is only fragmentarily indicated in the drawing. A first clamping device or clamping means 23 renders possible that the eccentric drum 18 can be clamped in any desired position in the generating drum 17. The center of gravity of the eccentric drum 18 is not located in an axis of rotation 40 of the generating drum 17. Therefore, the force of gravity produces a torque which tends to rotate the eccentric drum 18 until the center of gravity of the latter is located below the axis of rotation 40 of the generating drum 17.

The orientation drum 19 is rotatably mounted in the eccentric drum 18. A second clamping device or clamping means 24 renders possible that the orientation drum 19 can be clamped in any desired position in the eccentric drum 18. Here again, the center of gravity of the orientation drum 19 is not located in the axis of rotation 40 of the generating drum 17. The force of gravity thus produces a torque which tends to rotate the orientation drum 19 until the center of gravity of the latter is located below the axis of rotation 40 of the generating drum 17.

The inclination drum 20 is rotatably mounted in the orientation drum 19. A third clamping device or clamping means 25 renders possible that the inclination drum 20 can be clamped in any desired position in the orientation drum 19. Here again, the center of gravity of the inclination drum 20 is not located in the axis of rotation 40 of the generating drum 17. The force of gravity thus produces a torque which tends to rotate the inclination drum 20 until the center of gravity of the latter is located below the axis of rotation 40 of the generating drum 17.

Furthermore, it is also of importance to determine the position of the center of gravity of the inclination drum 20 with respect to the axis of rotation of the orientation drum 19, and the position of the center of gravity of the orientation drum 19 with respect to the axis of rotation of the eccentric drum 18.

A locking device 26, for instance a bolt, renders possible the locking or arresting of the cutter head 21 in any desired position in the inclination drum 20, so that the cutter head 21 can no longer rotate relative to the inclination drum 20.

For the drive of the cutter head 21 there is provided a gear train which extends through all the drums 17, 18, 19 and 20. A first shaft 27, at which there is fastened at one end thereof a gear wheel 28 and at the other end thereof a bevel gear 29, and a second shaft 30, at which there is fastened at one end thereof a bevel gear 31 and at the other end thereof a further bevel gear 32, are rotatably mounted in the orientation drum 19.

A third shaft 33, at which there are mounted bevel gears 35 and 36, and a fourth shaft 34, at which there are mounted a bevel gear 37 and a gear wheel 38, are rotatably mounted in the inclination drum 20.

The gear wheel 28 at the outset or start of the gear train engages with a further gear train not particularly shown in the drawings. The bevel gear 29 of the first shaft 27 engages with the bevel gear 31 of the second shaft 30. The bevel gear 32 of the second shaft 30 engages with the bevel gear 35 of the third shaft 33, and the bevel gear 36 of the third shaft 33 engages with the bevel gear 37 of the fourth shaft 34. The gear wheel 38 of the fourth shaft 34 engages with an internal gear 39 of the cutter head 21. This gear train is known to the art.

Figure 3A:
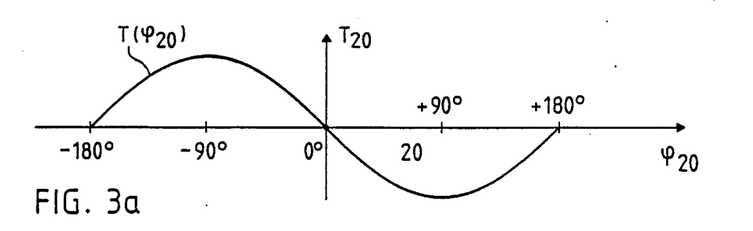
FIGS. 3a through 3d show diagrams with the torque of the four drums as a function of the angle of rotation.
Figure 3B:
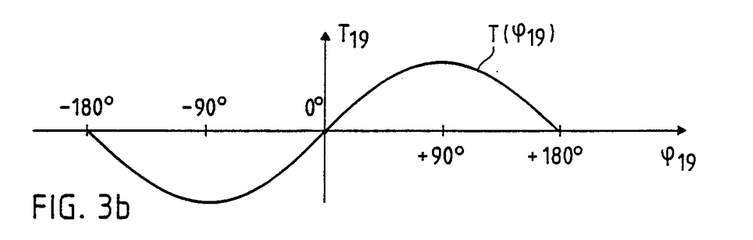
Figure 3C:
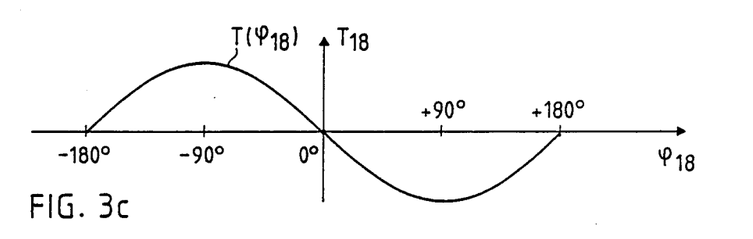

According to FIGS. 3a, 3b and 3c, the torque produced by the force of gravity at the inclination drum 20, the orientation drum 19 and the eccentric drum 18 varies in a sinusoidal or sine-shaped manner. When the center of gravity of a setting drum reaches its highest or lowest point, this torque vanishes. Between the highest point and the lowest point of the center of gravity, the torque reaches its smallest or greatest torque value, i.e. the rotation of the respective setting drum is either augmented or obstructed by the force of gravity.

In the case of the torque produced by the force of gravity at the inclination drum 20 as depicted in FIG. 3a, the center of gravity is in its highest position at −180° and no torque is present. At −90° the torque is at a maximum and thus promotes rotation. When the center of gravity is at its lowest position at 0°, there is again no torque present. At +90° the torque is at a minimum, i.e. it is negative and thus obstructs or impedes angular motion.

In the case of the orientation drum 19, the torque diagram thereof being depicted in FIG. 3b, the conditions are precisely the opposite of those shown in FIG. 3a. At −180° the center of gravity of the orientation drum 19 is in its lowest position and there is no torque available. The torque initially becomes negative and obstructs or impedes rotation of the orientation drum 19. When the center of gravity is in its highest position at 0°, again no torque exists. The torque subsequently increases to its greatest value and thus promotes rotation of the orientation drum 19.

The conditions for the eccentric drum 18 [FIG. 3c] are precisely the same as those shown in FIG. 3a for the inclination drum 20. At −90° the greatest torque is available, such torque promoting rotation of the eccentric drum 18. At +90° the smallest torque is available, such torque restricting rotation of the eccentric drum 18.

Figure 3D:
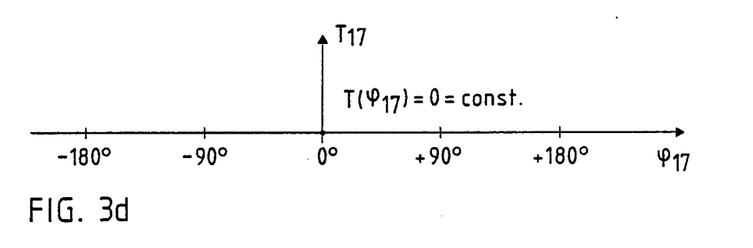
Figure 4:
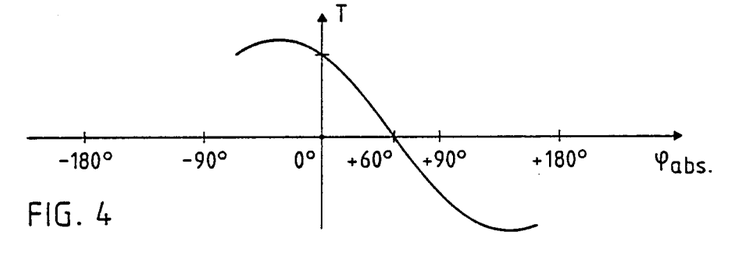
FIG. 4 shows a diagram similar to those in FIGS. 3a to 3c for a first variant.
Figure 5A:
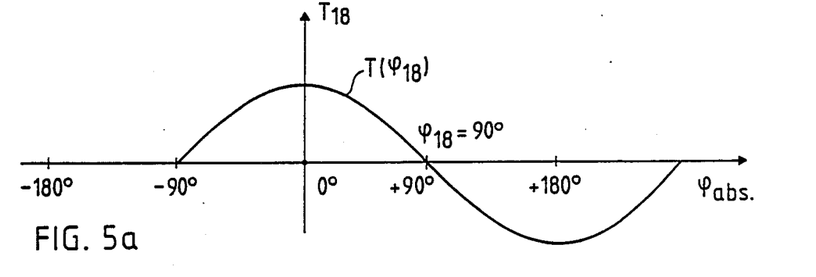
FIGS. 5a through 5d show diagrams similar to those in FIGS. 3a to 3c for a second variant.
Figure 5B:
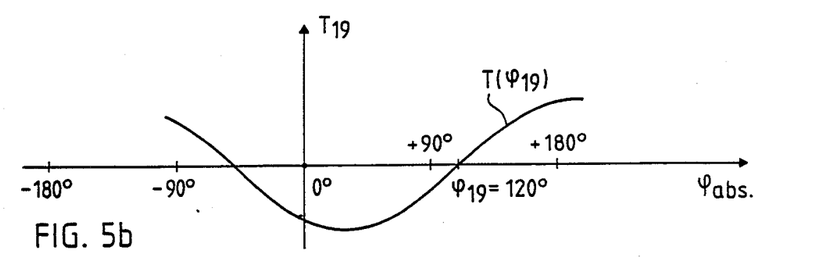
Figure 5C:
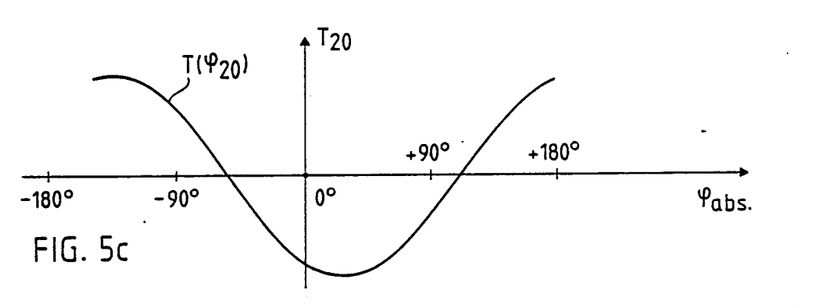
Figure 5D:
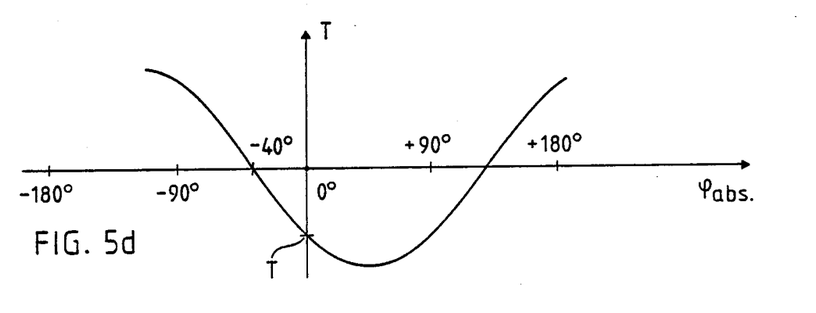

As depicted in FIG. 3d, no torque acts upon the generating drum 17 because the center of gravity of the latter is always located at the axis of rotation 40 of the generating drum 17.

These torques of the inclination drum 20, the orientation drum 19 and the eccentric drum 18 are superimposed when the inclination drum 20, the orientation drum 19 and the inclination drum 18 are mutually clamped to one another. This can be derived from FIG. 4 and FIGS. 5a through 5d. Such superimposed torques can be utilized to promote the rotation of the three setting drums 20, 19 and 18 when the latter should be positioned and subsequently fixed as will be discussed in greater detail hereinafter. A position-reading system with magnetic scales is provided for the generating drum 17 and each of the setting drums 18, 19 and 20, so that the position of the generating drum 17 and each individual setting drum 18, 19 or 20, can be accurately read out.

Having now had the benefit of the foregoing discussion of the exemplary embodiment of the apparatus for adjusting the drums of a bevel-gear cutting machine, the mode of operation of such apparatus is hereinafter described and is as follows:

(1) By way of example, the inclination drum 20 is to be rotated through 60° with respect to the orientation drum 19. For this purpose, initially the clamping device or means 25 between the inclination drum 20 and the orientation drum 19 must be released. On the other hand, the eccentric drum 18 must be secured at the generating drum 17 by means of the clamping device or means 23, and the orientation drum 19 must be secured at the eccentric drum 18 by means of the clamping device or means 24. Finally, the inclination drum 20 has to be locked at the cutter head 21 by means of the locking device 26, and the cutter head 21 is secured against rotation by means of the gear train 28 through 39. In this manner, neither the cutter head 21 nor the inclination drum 20 can be rotated. The generating drum 17 and the eccentric drum 18 secured thereat as well as the orientation drum 19 clamped to the eccentric drum 18 can be rotated by means of the drive of the generating drum 17. If the generating drum 17 and the two setting drums 18 and 19 are now rotated through 60° while the inclination drum 20 remains stationary, there results a relative rotation of the inclination drum 20 through the desired angle of 60° with respect to the orientation drum 19. The inclination drum 20 then can be secured at the orientation drum 19 by means of the clamping device 25.

(2) In analogous manner the orientation drum 19 can be rotated through any desired angle with respect to the eccentric drum 18. Again in the first place, the clamping device 24 between the orientation drum 19 and the eccentric drum 18 has to be released. Furthermore, the eccentric drum 18 must be clamped to the generating drum 17 by means of the clamping device 23. Likewise, the orientation drum 19 must be clamped at the inclination drum 20 by means of the clamping device 25. Finally, the inclination drum 20 must be locked at the cutter head 21 by means of the locking device 26. The cutter head 21 is secured against rotation by means of the gear train 28 through 39. In this manner, neither the cutter head 21, nor the inclination drum 20, nor the orientation drum 19 can be rotated. The generating drum 17 and the eccentric drum 18 secured thereat can be rotated by means of the drive of the generating drum 17. If the generating drum 17 and the setting drum 18 are now rotated through the desired angle of, for example, again 60°, while the inclination drum 20 and the orientation drum 19 clamped thereat remain stationary, there results the desired relative rotation of the orientation drum 19 through the desired angle of 60° with respect to the eccentric drum 18. The orientation drum 19 then can be secured or clamped at the eccentric drum 18 by means of the clamping device 24.

(3) In analogous manner, the eccentric drum 18 can be rotated through any desired or required angle with respect to the generating drum 17. First of all, the clamping device 23 between the eccentric drum 18 and the generating drum 17 has to be released. Moreover, the eccentric drum 18 must be secured at the orientation drum 19 by means of the clamping device 24, and this orientation drum 19 must be secured, in turn, at the inclination drum 20 by means of the clamping device 25. This inclination drum 20 must be locked at the cutter head 21 by means of the locking device 26. The cutter head 21 is secured against rotation by means of the gear train 28 through 39. In this manner, the inclination drum 20, the orientation drum 19 and the eccentric drum 18 are secured against rotation by means of the cutter head 21. The generating drum 17 can be rotated with respect to the eccentric drum 18 through the desired angle by means of the drive of the generating drum 17. The eccentric drum 18 then can be clamped at the generating drum 17 by means of the clamping device 23.

The above discussed rotation of the generating drum 17, the eccentric drum 18, the orientation drum 19 and the inclination drum 20 relative to one another can be promoted by the torques produced by the force of gravity and acting upon the setting drums 18, 19 and 20, provided a suitable starting position is selected (FIG. 5).

Figure 6:
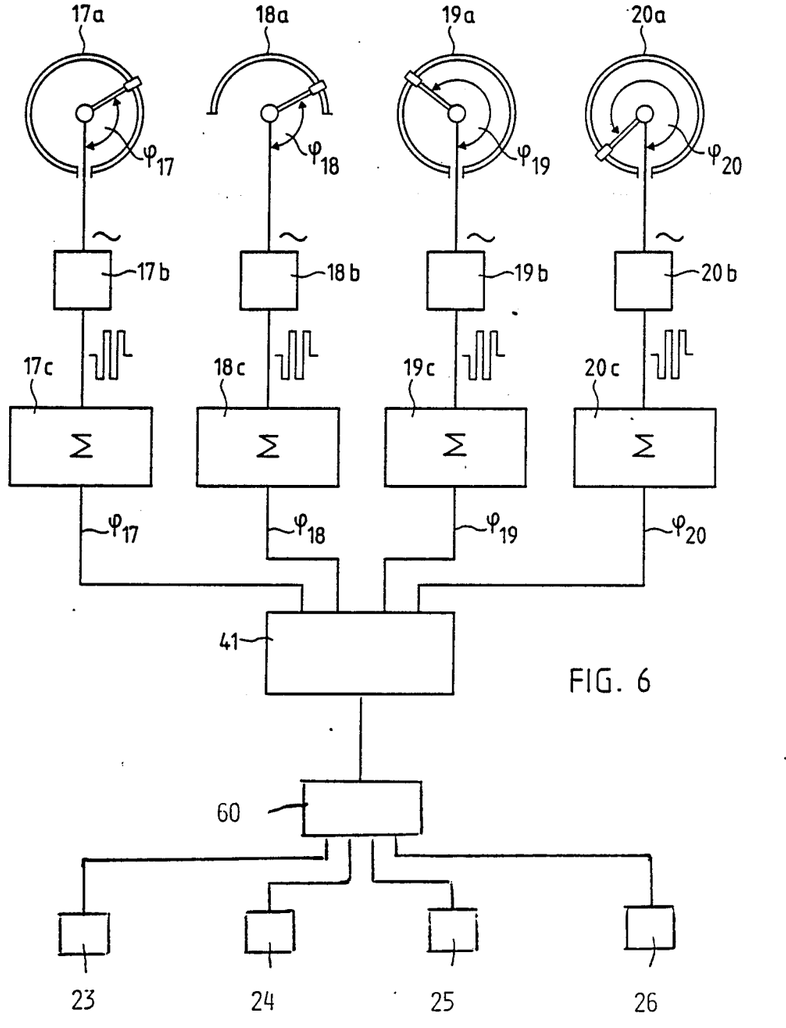
FIG. 6 schematically shows in a block or functional flow diagram the control of the drive arrangement for the drums of the bevel-gear cutting machine.

According to FIG. 6, the position of the four drums, namely the generating drum 17, the eccentric drum 18, the orientation drum 19 and the inclination drum 20 are displayed in a computer or computer means 41 by a position-reading system. This position-reading system comprises four magnetic scales 17a, 18a, 19a and 20a, which can extend around either the entire circumference of the aforesaid four drums or only a part or portion of the circumference thereof. Respective voltage transformers 17b, 18b, 19b and 20b are connected to the four magnetic scales 17a, 18a, 19a and 20a, respectively, such voltage transformers 17b, 18b, 19b and 20b generating rectangular or square wave voltage pulses from sinusoidal voltage variations or fluctuations as schematically indicated in the drawing. At the voltage transformers 17b, 18b, 19b and 20b there are connected respective summation converters 17c, 18c, 19c and 20c by means of which the signals delivered from the voltage transformers 17b, 18b, 19b and 20b are summed. The sum of these signals corresponds in each case with the angle through which the respective drum has been rotated. A very accurate positioning of the drums 17, 18, 19 and 20 is rendered possible by the magnetic scales 17a, 18a, 19a and 20a. Together with the indispensable accuracy of the reading system, the accuracy of the stepping drive for driving the generating drum 17 is also essential. It is possible, for example, that one step of the stepping drive of the generating drum 17 corresponds with one pulse of the magnetic scales 17a, 18a, 19a and 20a.

As shown in FIG. 6 a computer-aided actuator or actuating means 60, operatively connected with the computer or computer means 41, is provided for controlling the locking device 26 and the clamping devices 23 to 25 in order to positionally fix each respective setting drum 18, 19 and 20 in a desired or predetermined position at an adjacent setting drum.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for adjusting the drums of a bevel-gear cutting machine, comprising:
   a generating stock;
   said generating stock containing a motor-driven generating drum and a plurality of setting drums;
   each setting drum being adjustable to a predetermined setting position;
   means for clamping a setting drum at a setting drum adjacent thereto in said predetermined setting position;
   means for reading said predetermined setting position of each setting drum;
   a cutter head rotatably mounted in said plurality of setting drums;
   a gear train for driving said cutter head;
   computer means for controlling the adjustment of said plurality of setting drums;
   locking means controllable by said computer means;
   said locking means serving to lock at said cutter head one setting drum of said plurality of setting drums;
   said means for reading said predetermined setting position of each setting drum constituting automatic position-reading means for transmitting to said computer means the positions of said plurality of setting drums;
   actuating means controllable by said computer means; and said actuating means serving to actuate said means for clamping a setting drum at a setting drum adjacent thereto in said predetermined setting position.

2. The apparatus as defined in claim 1, wherein: said plurality of setting drums comprises an eccentric drum, an orientation drum and an inclination drum.

3. The apparatus as defined in claim 1, wherein: said motor-driven generating drum is utilized for adjusting a setting drum of said plurality of setting drums;

said gear train at standstill serving to lock said cutter head;

said cutter head locked by said gear train being utilized for retaining other setting drums of said plurality of setting drums;

said other setting drums of said plurality of setting drums including said setting drum to be adjusted by said motor-driven generating drum and setting drums located between said setting drum to be adjusted and said one setting drum locked at said cutter head by said locking means; and said means for clamping a setting drum at a setting drum adjacent thereto in said predetermined setting position including means for clamping said other setting drums at said cutter head and for clamping at said generating drum the setting drums located between said generating drum and said setting drum to be adjusted.

4. The apparatus as defined in claim 1, wherein:

the setting drums of said plurality of setting drums each possess respective eccentrically arranged mass centers; and said eccentrically arranged mass centers producing torques for facilitating the adjustment of said plurality of setting drums.

* * * * *